United States Patent [19]
Onozawa

[11] Patent Number: 5,472,918
[45] Date of Patent: Dec. 5, 1995

[54] OPTICAL GLASS

[75] Inventor: Masahiro Onozawa, Sagamihara, Japan

[73] Assignee: Kabushiki Kaisya Ohara, Japan

[21] Appl. No.: 331,327

[22] Filed: Oct. 28, 1994

[30] Foreign Application Priority Data

Nov. 26, 1993 [JP] Japan .................. 5-321155

[51] Int. Cl.$^6$ .................. C03C 3/064; C03C 3/089
[52] U.S. Cl. .................. 501/65; 501/67; 501/77; 501/79; 501/903
[58] Field of Search .................. 501/903, 65, 67, 501/77, 79

[56] References Cited

U.S. PATENT DOCUMENTS

| | | | |
|---|---|---|---|
| 4,540,672 | 9/1985 | Boudot et al. | 501/67 X |
| 4,814,299 | 3/1989 | Ross et al. | 501/903 X |
| 4,980,318 | 12/1990 | Aravjo | 501/77 X |
| 5,300,467 | 4/1994 | Ishizaki et al. | 501/67 |
| 5,424,255 | 6/1995 | Kassner | 501/77 X |

*Primary Examiner*—Karl Group
*Attorney, Agent, or Firm*—Hedman, Gibson & Costigan

[57] ABSTRACT

An optical glass including as its main ingredients in weight percent 25–50% $SiO_2$, 16–40% $B_2O_3$, 5–25% SrO and 1–10% $Li_2O$ has optical constants of refractive index (Nd) of 1.55–1.65 and Abbe number (vd) of 55–63 and a yield point (At) below 600° C. which is suited for mold pressing.

2 Claims, No Drawings

OPTICAL GLASS

BACKGROUND OF THE INVENTION

This invention relates to an optical glass of a $SiO_2$—$B_2O_3$—$SrO$—$Li_2O$ system having optical constants of a refractive index (Nd) of 1.55–1.65 and an Abbe number (vd) of 55–63, an excellent chemical durability and a relatively low softening point.

Known in the art are heavy crown system glasses having the above described optical constants. For example, the Glass Composition Data Book 1991 published by Japan Glass Products Industries Association describes many Sk (Schotcatalog name) types of glasses. These glasses, however, generally have a high yield point (At) exceeding 600° C. and, for this reason, they require a high forming temperature. These glasses therefore are not suitable for mold pressing used for directly forming optical elements which do not require a grinding or polishing process after the press forming process. In mold presses, there arises the problem of shortening of the life of molds when the glass forming temperature is high and, for this reason, the yeild point of the glass used in these molds should be as low as possible.

For overcoming such problem, there has been proposed a glass of a system in which $R'_2O$ (where R' represents an alkali metal) has been introduced. For example, Japanese Patent Application Laid-open No. Hei 4-292435 discloses a glass which contains a $TeO_2$ ingredient as an essential element for preventing deterioration of chemical durability caused by merely introducing $R'_2O$ in the conventional $SiO_2$—$B_2O_3$—$BaO$ system glass. This glass, however, has not a sufficient acid-proof property. For another example, Japanese Patent Application Laid-open No. Sho 60-122747 discloses a glass of a $SiO_2$—$B_2O_3$—$CaO$—$Li_2O$ system. This glass, however, is also insufficient in the acid-proof property and tends to have a discolored surface and therefore is not suitable for mold pressing.

It is, therefore, an object of the invention to provide an optical glass which has optical constants of a refractive index (Nd) of about 1.55–1.65 and an Abbe number (vd) of about 55–63 and a yield point (At) which is suitable for mold pressing and yet has an excellent chemical durability.

SUMMARY OF THE INVENTION

Accumulated studies and experiments made by the inventors of the present invention for achieving the above described object have resulted in a finding, which has led to the present invention, that an optical glass which has the above described desired optical constants and is suitable for mold pressing, i.e., having a low yield point and an excellent chemical durability, can be obtained in a $SiO_2$—$B_2O_3$—$SrO$—$Li_2O$ system glass within a specific composition range which has not been disclosed in the past.

The optical glass achieving the above described object of the invention consists in weight percent of:

| | |
|---|---|
| $SiO_2$ | 25–50% |
| $B_2O_3$ | 16–40% |
| $Al_2O_3$ | 0–5% |
| $TiO_2$ | 0–1% |
| $ZrO_2$ | 0–5% |
| ZnO | 0–5% |
| MgO | 0–5% |
| CaO | 0–8% |

-continued

| | |
|---|---|
| SrO | 5–25% |
| BaO | 0–9% |
| $Li_2O$ | 1–10% |
| $Na_2O + K_2O$ | 0–5% |
| $Sb_2O_3$ | 0–1% |

According to the invention, there is provided an optical glass having optical constants of refractive index (Nd) of 1.55–1.65 and Abbe number (vd) of 55–63 and a yield point (At) below 600° C. and having an excellent chemical durability as compared with the conventional optical glasses. Further, the optical glass according to the invention is easy to manufacture and homogenize so that it is suited for mold pressing.

DETAILED DESCRIPTION OF THE INVENTION

In the optical glass made according to the invention, the above described content ranges of the respective ingredients have been selected for the reasons stated below. In the following description, the content ranges of the respective ingredients are expressed in weight percent.

The $SiO_2$ ingredient which is essential for forming a glass should be within the range of 25–50%. If the amount of $SiO_2$ is less than 25%, chemical durability of the glass is deteriorated whereas if the amount exceeds 50%, it becomes difficult to maintain the low softening point and the optical constants which are the target of the optical glass of the invention.

The $B_2O_3$ ingredient is effective for imparting the low softening point property to the glass. If the amount is less than 16%, devitrification tendency of the glass will increase whereas if the amount exceeds 40%, chemical durability will be deteriorated.

The $Al_2O_3$ ingredient is effective for improving the chemical durability of the glass. if the amount exceeds 5%, the devitrification tendency will increase and also the yield point temperature (At) will rise.

The $TiO_2$ ingredient may be added for preventing solarization of the glass and adjusting the optical constants. The amount of this ingredient will suffice at 1% at the maximum.

The $ZrO_2$ ingredient may be added for increasing the refractive index and improving the chemical durability. If the amount exceeds 5%, the devitrification tendency will increase.

In the present invention, the SrO ingredient is an important ingredient which, by coexisting with the $B_2O_3$ ingredient of the above described specific content range, has been found to maintain the low softening point property and exhibit an excellent acid proof property.

In the conventional glass systems having the above described optical constants, the SrO ingredient has been added for adjusting the optical constants as an ingredient which performs the same function as BaO and CaO. In the present invention, it has unexpectedly been found that the SrO ingredient not only increases the refractive index of the glass but also is comprehensively the most advantageous ingredient in respect of low dispersion property, chemical durability and low softening point property as compared with other divalent metal oxides. In the past, it was difficult to introduce a large amount of the SrO ingredient in a glass because it deteriorates the stability of the glass. It has unexpectedly been found that, according to the invention, a sufficiently stable glass can be produced despite addition of a large amount of the SrO ingredient by adding the $B_2O_3$ ingredient in the amount of 16% or more.

For obtaining excellent chemical durability and low softening property while maintaining the stability of the glass, the amount of the SrO ingredient should be 5–25%. If the comparative examples (A, B and C) of the conventional optical glasses together with results of measurement of refractive index (Nd), Abbe number (vd), yield points (At, °C.) and chemical durability of each example and comparative example.

| No | Examples (weight %) | | | | | | | | | | Comparative Examples (weight %) | | |
|---|---|---|---|---|---|---|---|---|---|---|---|---|---|
| | 1 | 2 | 3 | 4 | 5 | 6 | 7 | 8 | 9 | 10 | A | B | C |
| $SiO_2$ | 25.0 | 27.4 | 38.0 | 42.0 | 43.1 | 44.0 | 45.2 | 45.2 | 46.8 | 50.0 | 38.7 | 42.0 | 45.8 |
| $B_2O_3$ | 29.0 | 40.0 | 28.9 | 24.0 | 21.3 | 23.0 | 17.0 | 20.0 | 19.6 | 16.0 | 14.9 | 24.0 | 12.0 |
| $Al_2O_3$ | 3.0 | | | 1.0 | 2.0 | 3.0 | 5.0 | | | | 5.0 | 1.0 | 4.0 |
| $TiO_2$ | | 1.0 | 0.1 | | 0.1 | 0.2 | | 0.5 | | 0.1 | | | |
| $ZrO_2$ | 5.0 | | | | 1.0 | 1.0 | | 1.5 | | | | | |
| ZnO | 5.0 | 4.6 | | 3.0 | 2.6 | 1.6 | 5.0 | 0.5 | | 1.8 | | | 8.0 |
| MgO | | | 5.0 | | | | | | | | | | |
| CaO | 4.0 | 7.0 | 8.0 | | 5.8 | 3.0 | | | | 3.0 | | | 20.0 |
| SrO | 25.0 | 11.0 | 5.0 | 22.8 | 10.0 | 17.1 | 17.7 | 13.2 | 24.5 | 20.6 | | | |
| BaO | | 2.0 | 9.0 | | 6.0 | | | 9.0 | | | 40.1 | 22.8 | |
| $Li_2O$ | 4.0 | 6.0 | 1.0 | 7.0 | 7.0 | 7.0 | 5.0 | 10.0 | 9.0 | 8.0 | | 7.0 | 5.0 |
| $Na_2O$ | | | 2.5 | | | | 5.0 | | | | | | 5.0 |
| $K_2O$ | | | 2.5 | | 1.0 | | | | | | | | |
| $Sb_2O_3$ | | 1.0 | | 0.2 | 0.1 | 0.1 | 0.1 | 0.1 | 0.1 | 0.5 | 1.0 ($As_2O_3$) 0.3 | 0.2 ($TeO_2$) 3.0 | 0.2 |
| nd | 1.6250 | 1.5944 | 1.5711 | 1.5834 | 1.5865 | 1.5792 | 1.5676 | 1.5922 | 1.5868 | 1.5886 | 1.5891 | 1.5818 | 1.5910 |
| vd | 58.1 | 59.7 | 61.5 | 62.7 | 61.0 | 61.8 | 61.0 | 60.2 | 62.9 | 61.7 | 61.3 | 62.8 | 57.0 |
| At | 530 | 537 | 555 | 541 | 550 | 549 | 548 | 525 | 532 | 533 | 650 | 540 | 549 |
| acid proof property | O | O | O | O | O | O | O | O | O | O | O | X | X | amount is less than 5%, the acid proof property of the glass will be deteriorated whereas if the amount exceeds 25%, the glass becomes instable rather than it becomes stable as desired.

The ZnO, MgO, CaO and BaO ingredients which are the other divalent metal oxides may be added for adjusting the optical constants. If, however, the amounts of these ingredients exceed 5%, 5%, 8% and 9% respectively, sufficient stability of the glass will not be obtained and the chemical durability of the glass will be deteriorated.

The $Li_2O$ ingredient is an important ingredient because it is particularly effective for imparting the low softening point property to the glass. For enabling this ingredient to perform this function while preventing increase in the devitrification tendency, the amount of this ingredient should be within the range of 1–10%.

The $Na_2O$ and $K_2O$ ingredients may be added according to necessity for obtaining the low softening point property. The total amount of these ingredients should not exceed 5% for preventing increase in the devitrification tendency and maintaining the chemical durability.

The $Sb_2O_3$ ingredient may be added as a refining agent in melting the glass. The amount of this ingredient will suffice at 1% at the maximum.

Other ingredients than those described above, e.g., $La_2O_3$, $Bi_2O_3$, $Cs_2O$, SnO and F, may be added, when necessary, up to the total amount of about 3% for adjusting the optical constants and improving melting property and preventing the devitrification tendency.

EXAMPLES

The following Table shows examples of the optical glass made according to the invention (No.1 to No. 10) and As shown in the above Table, the glasses of the examples of the present invention have desired optical constants and low yield point (At) and, moreover, is improved in chemical durability over the glasses of the comparative examples. Besides, these glasses of the examples of the present invention have an excellent property against devitrification and are easy to homogenize. For these reasons, the glasses of the examples of the present invention are easy to manufacture and very suitable for press molding.

The acid proof property test was made by soaking glass specimens (about 30 mm×30 mm×5 mm) having unpolished and polished opposite surfaces in a 3N nitric acid aqueous solution (25° C.) for 30 minutes and observing the degree of erosion of the two surfaces. The glass which has not undergone any change in either surface but maintained its transparency is indicated by a circle mark and the glass which has been eroded in both of the surfaces and its transparency has been impaired is indicated by a cross mark.

The glasses of the examples of the present invention can be obtained easily by weighing and mixing optical glass raw materials including oxides, carbonates, nitrates and hydroxides at the predetermined ratio, melting these raw materials in a platinum crucible at a temperature within a range of 1150° C. to 1350° C. for about two to four hours depending upon the degree of melting according to the composition of the glass, stirring the molten glass to homogenize it and thereafter casting it in a mold and annealing it.

What is claimed is:

1. An optical glass consisting in weight percent of:

| | |
|---|---|
| $SiO_2$ | 25–50% |
| $B_2O_3$ | 16–40% |
| $Al_2O_3$ | 0–5% |

-continued

| | |
|---|---|
| TiO$_2$ | 0–1% |
| ZrO$_2$ | 0–5% |
| ZnO | 0–5% |
| MgO | 0–5% |
| CaO | 0–8% |
| SrO | 5–25% |
| BaO | 0–9% |
| Li$_2$O | 1–10% |
| Na$_2$O + K$_2$O | 0–5% |

-continued

| | |
|---|---|
| Sb$_2$O$_3$ | 0–1%. |

2. An optical glass as defined in claim 1 having optical constants of refractive index (Nd) of 1.55–1.65 and Abbe number (vd) of 55–63 and a yield point (At) below 600° C.

* * * * *